United States Patent [19]

Williams

[11] 4,041,202

[45] Aug. 9, 1977

[54] STRIPPABLE TAPE

[76] Inventor: Robert E. Williams, 5812 Five Oaks Parkway, St. Louis, Mo. 63127

[21] Appl. No.: 339,379

[22] Filed: Mar. 7, 1973

Related U.S. Application Data

[63] Continuation-in-part of Ser. No. 72,348, Sept. 15, 1970, abandoned.

[51] Int. Cl.² .............................................. B32B 3/10
[52] U.S. Cl. .................................. 428/138; 156/304; 156/344; 428/172; 428/294; 428/394; 428/354; 206/631
[58] Field of Search ............... 161/117, 113, 167, 406, 161/142, 143, 144, 164; 229/49, 51 ST, 51 WB; 206/59 C; 156/304, 251, 344, 247, 271, 254, 259; 428/40, 41, 42, 172, 155, 138, 343, 354, 244, 189

[56] References Cited

U.S. PATENT DOCUMENTS

| | | | |
|---|---|---|---|
| 1,827,636 | 10/1931 | Ames | 229/49 |
| 2,096,389 | 10/1937 | Bode | 428/44 |
| 2,283,349 | 5/1942 | Angier | 229/49 |
| 2,319,272 | 5/1943 | Starr | 428/43 |
| 2,808,358 | 10/1957 | Masse | 156/248 |
| 2,895,865 | 7/1959 | Humphner | 229/49 |
| 3,306,517 | 2/1967 | Diesinger, Jr. | 229/49 |
| 3,368,736 | 2/1968 | McKellick | 229/49 |
| 3,504,844 | 4/1970 | Stark et al. | 161/167 |
| 3,523,859 | 8/1970 | Komp | 428/343 |
| 3,642,564 | 2/1972 | Walker et al. | 156/308 |

FOREIGN PATENT DOCUMENTS

| | | | |
|---|---|---|---|
| 1,910,076 | 9/1970 | Germany | 428/343 |
| 488,743 | 7/1938 | United Kingdom | 229/51 ST |

Primary Examiner—George F. Lesmes
Assistant Examiner—Stanley S. Silverman
Attorney, Agent, or Firm—Rogers, Eilers & Howell

[57] ABSTRACT

There is disclosed an improved strippable laminated tape particularly adapted for making carton joints, and for sealing flaps of cartons and the like, which can be easily stripped to free the joints or the flaps. The tape has a Kraft paper upper layer, preferably with filaments between the layers, and a bottom layer of low internal bond, all united, and with a longitudinal cut that may be straight, zigzag, diamond, or of other form, extending through the bottom layer. The under surface of the bottom layer may have adhesive on it. The tape is applied in usual manner to carton panels or flaps. To open the carton or separate the joint, the tape is stripped by pulling up one end, in which action the bottom layer delaminates the adhesive and parts of the low internal bond bottom layer, but due to the cut through that bottom layer, the sides or flaps are free, collapsing the carton, or providing ready access.

13 Claims, 8 Drawing Figures

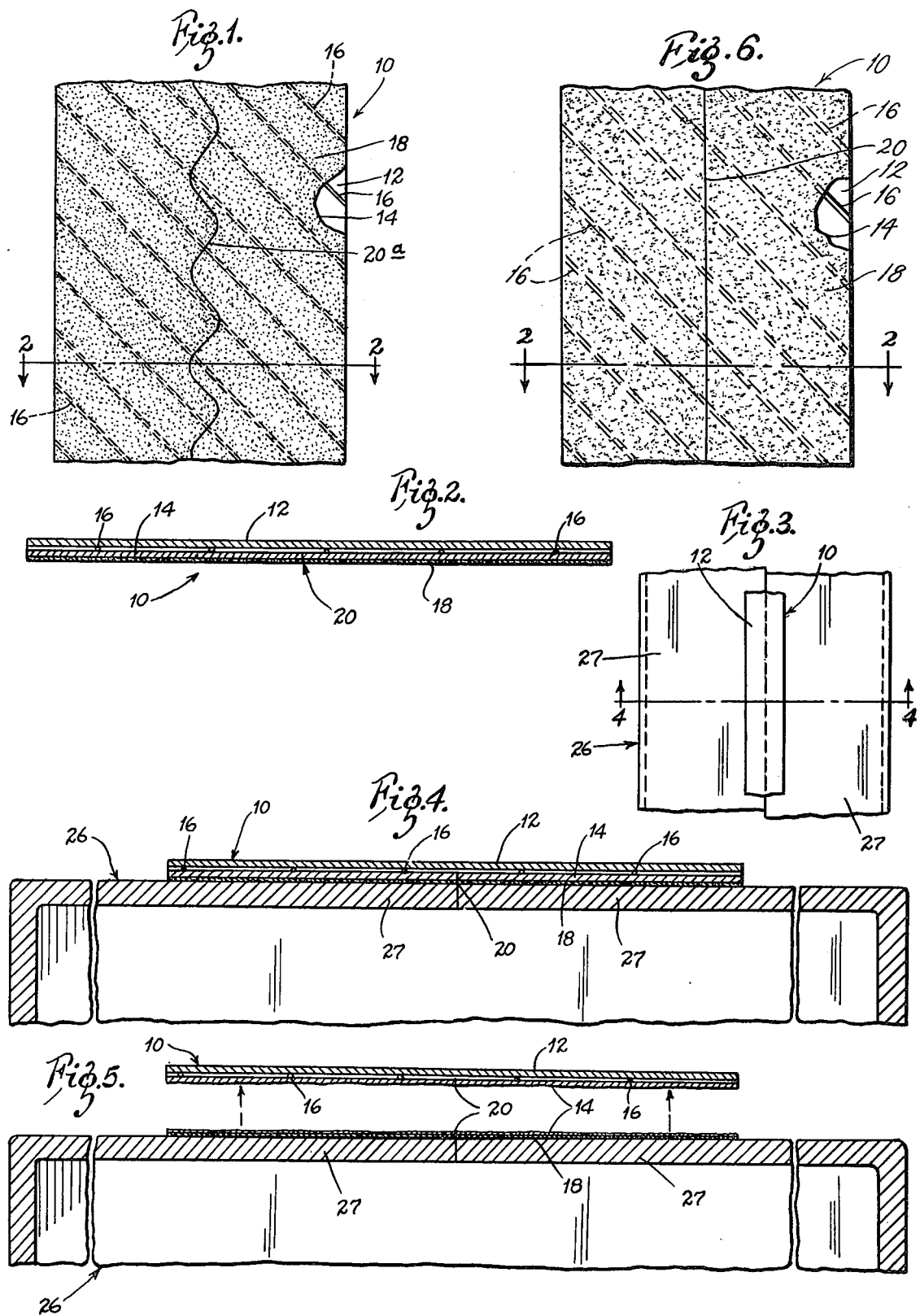

STRIPPABLE TAPE

This is a continuation-in-part of my application Ser. No. 72,348, filed Sept. 15, 1970, now abandoned.

BACKGROUND OF THE INVENTION

1. Field of the Invention

The present invention relates generally to strippable adhesive tapes for sealing carton flaps or joints during manufacture or after filling of the cartons. The purpose of the invention is to provide a tape that can be removed easily, leaving the joint entirely free, by a simple stripping operation, so that the contents of the carton may be reached, or so that the carton itself may be readily dismantled for flat packing to be recycled or destroyed.

2. Description of the Prior Art

In the prior art are many strippable sealing tapes. However, there has long been the need of an inexpensive strippable lightweight tape fulfilling standard requirements for securing a carton in manufacture or closing, yet strippable in a manner releasing the carton sides or flaps for instant access to or removal of the contents.

Among prior strippable tapes are laminated or single layer tapes using pull-cords, such as shown in the Stark U.S. Pat. No. 3,504,844, wherein a cord is secured medially along the bottom face of a reinforced laminated tape. The cord complicates reeling of the tape, since it causes a medial ridge in the roll, accumulating with each convolution. The tape is difficult to remove, since the cord must be located, and the draw force applied essentially to it rather than to the tape itself, if the joint is to be separated. Other like tapes have used multiple draw cords or fibers, with similar problems.

Another prior art type of strippable tape is that providing a draw-strip of strong tape material. As with the pull-cord tapes, the draw-strip tapes require an additional element, adding cost. Draw-strip tapes also have the disadvantage that the draw-strip is normally not glued to the carton, and so weakens the overall strength of the tape by leaving a band along the carton panels or flaps that is unsecured. This is a serious disadvantage in that it not only reduces the transverse strength of the joint, but also permits a slippage of the joint edges in kneading type movements that shortens its life. Some non-strippable tapes, such as in the Angier U.S. Pat. No. 2,283,349 have this last disadvantage without having a stripping feature.

A further prior type of tape simply employed perforations through the tape, so that a medial strip can be pulled out. If the medial strip is glued down, it cannot readily be pulled off. If it is not glued down, it weakens the joint. If the tape is fiber reinforced, the perforated strip is largely ineffective.

In using many prior art tapes, even where they have a bottom lamination of low internal bond, that can delaminate to permit stripping, the lack of a clean separation of the stripped joint requires either a blow on the panels to complete their separation, or as is the more frequent practice, the use of a sharp razor blade to do so. Any such practice requires added labor and cost; and the use of the razor blade too often results in damage to the contents.

The present invention overcomes the foregoing problems. It incorporates a strong upper layer, that may be reinforced with fibers. This layer provides adequate strength to the joint. By having a bottom layer of low internal bond material, that is firmly united with the upper layer throughout the extend of the upper layer, with adhesive throughout the under side of the bottom layer, the strong upper layer is bonded to the box panels throughout its width, and all the way across the tape and the joint. By virtue of the medial slit along the through the bottom layer, which may be only of knifeblade width, the stripping of the tape, with internal delamination of the bottom layer, leaves the two lateral portions of the bottom layer separately on the two sides of the joint, with the joint completely separated.

An important feature of the present invention is that it does not seriously reduce the strength of the joint. Preferably it is used with fiber reinforcement in the tape, which may be between the upper and bottom layers. Since the slit is so narrow, and the adhesive extends from the edges of the tape to the strip, the fiber or other strength component or components, do not "work" as twisting or distorting forces are applied to the carton. The strength components can easily be made strong enough to provide adequate strength, either transversely or longitudinally of the tape.

If desired, the slit through the bottom layer may be extended laterally, by being made zig-zag or the like. This gives tolerance in applying the tape to a joint, as the slit will be effective to separate the joint upon stripping, even if the tape is laterally misplaced. However, usually this is unnecessary, as the joints have sufficient tolerance, and a single straight slit is in itself a visible marker that can be aligned with the line of junction of box panels.

The present tape can be used to seal carton closure flaps. It also can be used in manufacture of cartons, to seal edges. It makes such cartons reusable or recyclable, since the customer can quickly strip the tapes and revert the carton to a flat state for either shipment back to the factory for retaping and refilling, or shipment to a reprocessing plant to recover the paper.

The present tape is relatively inexpensive, easily made, and overcomes the problems of strippable tapes heretofore existing. It is described herein in connection with closing cartons, especially corrugated boxes, but its range of uses is much greater, as will be understood.

BRIEF DESCRIPTION OF THE DRAWINGS

FIG. 1 is a bottom plan view of a segment of strippable tape incorporating the teachings of the present invention;

FIG. 2 is an enlarged transverse, vertical cross-sectional view taken on substantially the line 2—2 of FIG. 1;

FIG. 3 is a fragmentary top plan view of an empty carton with the abutting top side flaps sealed by a segment of the present novel tape;

FIG. 4 is an enlarged transverse, vertical cross-sectional view taken on substantially the line 4—4 of FIG. 3, parts of the carton being broken away to conserve space;

FIG. 5 is a view similar to FIG. 4, illustrating the present novel tape pulled away from the carton side flaps leaving the adhesive and some of the bottom layer on the flaps, but the flaps effectively open;

FIG. 6 is a bottom plan view similar to FIG. 1, showing a differently configured cut or incision in or through the bottom layer;

DESCRIPTION OF A PREFERRED EMBODIMENT

Figure 7:
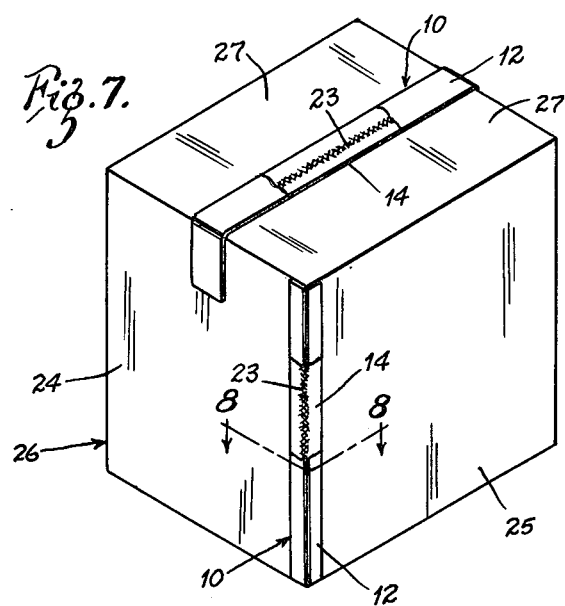
FIG. 7 is an isometric view of a carton having the present novel tape applied effecting a manufacture's joint along one side and closing the flaps.

Referring to the drawings, more particularly by reference numerals, in FIGS. 1-6, 10 indicates a strippable sealing tape including the principles of the present invention, a segment of which is shown. In its preferred form, the tape 10 may be standard Kraft tape including a top layer 12, a bottom layer 14, intermediate filaments 16 between the layers, and bottom adhesive 18. These parts are exaggerated in FIGS. 2, 4 and 5 for clarity of illustration. For some tapes, the adhesive may be applied directly to the sealed object, or otherwise applied at the time of using the tape. The top layer, and where used as in the preferred form, the filaments 16, constitute the principal strength component of the tape. The bottom layer 14, formed of low internal bond paper, adds some strength when it is bonded between the other layers, and it constitutes the means to secure the strength components to the object upon which the tape is used, across the tape and the joint.

Figure 8:
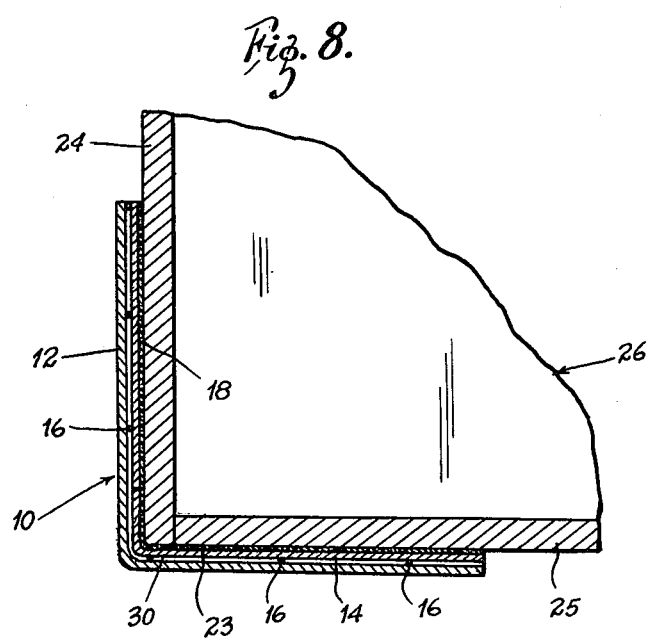
FIG. 8 is an enlarged cross-sectional view taken on substantially the line 8—8 of FIG. 7.

Through the adhesive 18 and into or through the bottom layer 14 is a cut or incision 20 (FIG. 6) which runs generally medially longitudinally of the tape 10. The cut 20 should be continuous but in less desirable form may be broken. Preferably it is straight as in FIG. 6. The scalloped or zig-zag configuration of the cut 20a of FIG. 1 affords some width which provides a margin or error in applying the tape 10 to abutted right angle side and end panels 24 and 25, respectively (FIGS. 7-8), in carton manufacture and to abutted closing flaps 27, or the like (FIG. 7), of a paperboard carton 26. However, the straight cut 20 of FIG. 6 affords a visual indicator that can be aligned with the joint to be sealed and this is ordinarily sufficient without the zig-zag cut.

In FIG. 4, the abutting closing flaps 27 and applied tape 10 are shown in exaggerated transverse cross section. The slit 20 or 20a is aligned with the abutting edges of the flaps. In FIG. 5, the tape has been stripped by pulling it upwardly, delaminating the low-internal bond bottom layer. In FIG. 5, the stripped or removed portion of the tape 10 is shown spaced above the carton leaving a portion of the bottom layer 14 and the adhesive 18 on the flaps 27. As indicated, some small amount of the bottom layer 14 sticks to the adhesive 18, hence, to the flaps 27, but the cut 20 or 20a insures effective separation of the flaps 27, which may be readily lifted for access to the contents of the carton 26.

As heretofore recited, the tape is used for either closing corners of a carton during its manufacture, or for sealing flaps after loading the box. (Other uses will be recognized.)

When this tape is used for closing corners (FIG. 7), it can be stripped off to permit the carton to be returned to flat condition and recycled for re-use. Stripping this tape does not significantly damage the carton. Tape for this purpose may be given longitudinal strength — particularly in the strength component — as the stresses are largely in that direction. With the adhesive extending substantially all across the tape, bonding it firmly across the corner panels, a very strong joint obtains, despite the slit through the bottom layer.

When the tape is used for sealing panels over openings, after packing goods in the carton, it can be made with especial strength transversely, since the principal loads on such closure panels are transverse. The filaments give such strength, and it also may be provided by the properties of the top layer 12. The composite tape can be made as strong as unslitted tape, again to a major extent because the slit or slits do not prevent the tape from being adhered to the panels substantially from edge to edge of the tape.

It is desirable to have the reinforcing fibers firmly united with the two laminations, since they can lose effectiveness if they can work and weave.

The strength component is usually and preferably of Kraft paper, but could be other material such as sheet plastic, provided the other characteristics of the tape can be maintained. The bottom layer could consist of two side-by-side strips of sheet plastic, the slit 20 being the separation between them, provided the other characteristics be maintained. In this case, the stripping requires separation between the top and bottom layers. A problem with using a plastic material in this manner is its cost, and a combination of Kraft backing with low-internal bond bottom layer slit as indicated, is the preferred embodiment.

Various changes and modifications may be made within this invention as will be readily apparent to those skilled in the art. Such changes and modifications are within the scope and teaching of this invention as defined by the claims appended hereto.

What is claimed is:

1. In a laminated, strippable tape for joining separable parts of an object: an upper strength layer and a bottom layer, the layers being of strip material adhered together substantially throughout their common width; adhesive on the bottom of the bottom layer of strip material by which the tape may be adhered to the object, the bottom layer also having a narrow medial slit of predetermined direction at least substantially through the thickness thereof leaving a line of separation between the lateral components of the layer not substantially wider than a conventional carton joint, whereby when the bottom layer is adhered to the separate parts of the object across a joint, the tape is bonded to the parts substantially from side to side of the tape; the bottom layer of the tape being paper of a low internal bond material that is internally delaminatable and the strength layer being of a material stronger than the bottom layer and resistant to internal delamination, so that when the tape is adhered to the object, and is pulled away therefrom, the bottom layer becomes internally delaminated by the lifting of the strength layer with part of the bottom layer, leaving no more than a delaminated portion of the bottom layer that is medially separated by the slit into separate parts, so that the joined parts of the object are then freed from each other.

2. In the tape of claim 1: the strength layer comprising a layer of tape and elongated fiber reinforcing material disposed on a surface of the strength layer to enhance the strength of the tape.

3. In the tape of claim 1: the strength layer being of strong Kraft paper, the bottom layer being of low internal bond paper slit medially by a knife-edge type slit extending through the bottom layer.

4. In the tape of claim 3: the tape having intermediate the Kraft layer and bottom layer, elongated reinforcing fibers firmly bonded therebetween, the slit not passing through the fibers.

5. In the tape of claim 1: the medial slit being narrow but sinuous so as to assure potential separation of the bottom layer onto the separable parts of the object.

6. In a strippable laminated tape for joints, cartons and like objects; a top layer of strip sheet material, an intermediate reinforcing portion of a fibrous character that provides tensile strength transversely of the strip, and which is difficult to cause to adhere by adhesive, and a bottom layer of strip sheet material, all laminated together into a sealing tape; and parting means in the form of at least one cutting extending lengthwise of the bottom layer at least largely through that layer and adapted to overlie the joint in the object, the bottom layer being adhered to the intermediate portion and top layer at least substantially from edge to edge of the tape, the tape being adapted to be secured to the object by adhesive between the bottom layer and the object, and when the bottom layer is adhered to the object, the bottom layer extends substantially from the outer edge of the tape inwardly substantially to the edges of the joint of the object, the bottom layer being of a separable delaminatable material that can strip apart when the tape is peeled from the object, leaving portions adhered to the object, and the parting means providing a ready separation of the joint when the tape is thus stripped from the object by removing at least the top layer and intermediate portion therefrom leaving the portions of the bottom layer adhered to the object on each side of the cutting.

7. The tape of claim 6, wherein there is adhesive on the bottom of the bottom layer.

8. The tape of claim 6, wherein the intermediate portion is transversely arranged filaments.

9. The tape of claim 6, wherein the top and bottom layers are Kraft paper or the like.

10. The tape of claim 6, wherein the parting means criss-crosses an area adapted to overlie the joint.

11. The tape of claim 6, wherein the parting means cutting extends through the bottom layer but not the intermediate portion or top layer.

12. The tape of claim 6, wherein the cutting provides multiple diamond-shaped severable parts of the bottom layer.

13. The tape of claim 6, wherein the top and bottom layers are paper-like material and the intermediate portion is filaments extending transversely of the tape, and wherein the cutting extends through the bottom layer, so that when the tape is stripped from the object, the bottom layer may split with some portions remaining on the object, such portions being severed by the cutting to permit the carton joint portions to be free.

* * * * *